United States Patent
Zeng et al.

(10) Patent No.: US 9,622,122 B2
(45) Date of Patent: Apr. 11, 2017

(54) METHOD AND DEVICE FOR HANDOVER OF MOBILE TERMINAL BETWEEN BASE STATIONS

(71) Applicant: Huawei Technologies Co., Ltd., Shenzhen (CN)

(72) Inventors: Kun Zeng, Shenzhen (CN); You Li, Shenzhen (CN); Yao Lu, Shenzhen (CN)

(73) Assignee: HUAHEI TECHNOLOGIES CO., LTD., Shenzhen (CN)

( * ) Notice: Subject to any disclaimer, the term of this patent is extended or adjusted under 35 U.S.C. 154(b) by 41 days.

(21) Appl. No.: 14/719,998

(22) Filed: May 22, 2015

(65) Prior Publication Data

US 2015/0257053 A1 Sep. 10, 2015

Related U.S. Application Data

(63) Continuation of application No. PCT/CN2013/073654, filed on Apr. 2, 2013.

(30) Foreign Application Priority Data

Nov. 22, 2012 (CN) .......................... 2012 1 0478972

(51) Int. Cl.
*H04W 36/20* (2009.01)
*H04W 36/00* (2009.01)
(Continued)

(52) U.S. Cl.
CPC ... *H04W 36/0072* (2013.01); *H04W 36/0083* (2013.01); *H04W 36/20* (2013.01); *H04W 36/30* (2013.01); *H04W 88/08* (2013.01)

(58) Field of Classification Search
CPC . H04W 36/30; H04W 36/20; H04W 36/0072; H04W 36/0083; H04W 88/08
(Continued)

(56) References Cited

U.S. PATENT DOCUMENTS 5,787,346 A * 7/1998 Iseyama ............ H04W 36/0083
370/331
2008/0227456 A1* 9/2008 Huang .............. H04W 72/0406
455/436
(Continued)

FOREIGN PATENT DOCUMENTS

CN 1997217 A 7/2007
CN 101379855 A 3/2009
(Continued)

OTHER PUBLICATIONS

3GPP 3GPP-TSG-RAN #58, R2-072382, RLF Recovery (Jun. 2007).*

*Primary Examiner* — William Nealon
(74) *Attorney, Agent, or Firm* — Brinks Gilson & Lione

(57) ABSTRACT

The present invention discloses a method and a device for handover of a mobile terminal between base stations, which relates to the field of communications technologies and can realize handover of user equipment between base stations in a condition of ensuring that business services of a neighboring base station and a target base station are not interrupted. An embodiment of the present invention includes: a source base station obtains a designated channel resource, and, by negotiating with a target base station and a neighboring base station, determines to send a handover command to user equipment. Embodiments of the present invention are mainly applied to a handover process of a base station.

16 Claims, 4 Drawing Sheets

(51) Int. Cl.
*H04W 36/30* (2009.01)
*H04W 88/08* (2009.01)

(58) Field of Classification Search
USPC .......................................................... 455/436
See application file for complete search history.

(56) References Cited

U.S. PATENT DOCUMENTS

| | | | |
|---|---|---|---|
| 2009/0196168 A1* | 8/2009 | Aydin | H04W 36/0055 370/216 |
| 2010/0027507 A1* | 2/2010 | Li | H04W 36/0055 370/331 |
| 2010/0254344 A1 | 10/2010 | Wei et al. | |
| 2010/0254348 A1* | 10/2010 | Prakash | H04W 36/18 370/331 |
| 2011/0287805 A1* | 11/2011 | Kaminski | H04W 36/08 455/525 |
| 2014/0314013 A1 | 10/2014 | Xiao et al. | |
| 2015/0139195 A1 | 5/2015 | Xiao et al. | |

FOREIGN PATENT DOCUMENTS

| | | |
|---|---|---|
| CN | 101933351 A | 12/2010 |
| CN | 102244904 A | 11/2011 |
| CN | 103167567 A | 6/2013 |
| WO | WO 2010/086172 A1 | 8/2010 |

* cited by examiner

METHOD AND DEVICE FOR HANDOVER OF MOBILE TERMINAL BETWEEN BASE STATIONS

CROSS-REFERENCE TO RELATED APPLICATIONS

This application is a continuation of International Application No. PCT/CN2013/073654, filed on Apr. 2, 2013, which claims priority to Chinese Patent Application No. 201210478972.2, filed on Nov. 22, 2012, both of which are hereby incorporated by reference in their entireties.

TECHNICAL FIELD

The present invention relates to the field of communications technologies and, in particular, to a method and a device for handover of a mobile terminal between base stations.

BACKGROUND

A cellular network is usually divided into multiple cells, and mobile terminals are managed by base stations attached to the cells. When a mobile terminal crosses a boundary of one cell and gets to another cell, the mobile terminal needs to be handed over from a source base station of a region where the mobile terminal currently locates to a target base station of a target region, so as to keep communications from being interrupted.

During a process of handing over user equipment between base stations, the source base station may allocate a channel resource for the user equipment, or the user equipment may actively request a channel resource, so as to send a handover command. At this time, if this channel resource is used by neighbouring base stations other than the source base station, the handover command sent from the source base station to the user equipment may be interfered by other neighbouring base stations, and thereby, the handover command cannot be accurately delivered to the user equipment, which will cause communications of the user equipment to be interrupted.

In order to solve the problem of interference between base stations, a solution is provided in prior art. In the solution, a source base station firstly allocates channel resources for user equipment, then notifies a neighbouring base station and a target base station that the source base station currently needs to exclusively occupy the channel resources to send a handover command to the user equipment, and finally uses the channel resources to send the handover command.

In a process of realizing the aforementioned solution, inventors find that there exists a following problem in the prior art: if the neighbouring base station or the target base station is using the channel resources to provide business services for user equipment, then these services need to be compulsorily interrupted so as to ensure transmission of the handover command from the source base station, thereby the services of the user equipment which is currently served by the neighbouring base station or the target base station using the channel resources may be interrupted.

SUMMARY

Embodiments of the present invention provide a method and a device for handover of a mobile terminal between base stations, which can realize handover of user equipment between base stations in a condition of ensuring that business services of a neighbouring base station and a target base station are not interrupted.

In order to achieve the aforementioned objective, the embodiments of the present invention adopt following technical solutions:

In a first aspect, the present invention provides a method for handover of a mobile terminal between base stations, including:

obtaining, by a source base station, a designated channel resource, wherein the designated channel resource is a channel resource used by the source base station to send a handover command to user equipment to be handed over;

notifying, by the source base station, the designated channel resource to a target base station for the handover and a neighbouring base station, so that the target base station for the handover and the neighbouring base station make reservation determination according to the designated channel resource; where the neighbouring base station is a base station being able to use the designated channel resource;

receiving, by the source base station, results of the reservation determination which are sent by the target base station for the handover and the neighbouring base station;

when it is determined, according to the results of the reservation determination of the target base station for the handover and the neighbouring base station, that the source base station is able to use the designated channel resource to send the handover command to the user equipment to be handed over, then using the designated channel resource to send the handover command to the user equipment to be handed over.

In a first possible implementation form according to the first aspect, the obtaining, by a source base station, a designated channel resource includes:

obtaining, by the source base station, an idle channel resource, where the idle channel resource includes an idle channel resource of the source base station and/or an idle channel resource of the target base station for the handover;

selecting, by the source base station, the designated channel resource according to the idle channel resource.

In a second possible implementation form according to the first aspect and the first possible implementation form of the first aspect, the selecting, by the source base station, the designated channel resource according to the idle channel resource includes:

determining, by the source base station, from the idle channel resource, a channel resource with a maximum signal-to-interference-plus-noise ratio to be the designated channel resource;

and/or, determining by the source base station, from the idle channel resource, a channel resource which relates to a minimum number of a co-frequency interference base station to be the designated channel resource;

and/or, determining, by the source base station, from the idle channel resource, a channel resource with minimum co-frequency interference to be the designated channel resource.

In a third possible implementation form according to the first aspect, the notifying, by the source base station, the designated channel resource to a target base station for the handover and a neighbouring base station includes:

carrying an identification of the designated channel resource in a handover request to send to the target base station; and carrying an identification of the designated channel resource in an indication signaling to send to the neighbouring base station.

In a fourth possible implementation form of the first aspect, after the notifying the designated channel resource to a target base station for the handover and a neighbouring base station, further including:

if the result of the reservation determination sent by the target base station for the handover is not received within a designated time, then determining that the target base station for the handover agrees to reserve the designated channel resource for the user equipment;

if the result of the reservation determination sent by the neighbouring base station is not received within the designated time, then determining that the neighbouring base station agrees to reserve the designated channel resource for the user equipment.

In a fifth possible implementation form according to the first aspect, the first possible implementation form of the first aspect, the second possible implementation form of the first aspect, the third possible implementation form of the first aspect, and the fourth possible implementation form of the first aspect, before the notifying, by the source base station, the designated channel resource to a target base station for the handover and a neighbouring base station, further including:

determining service information of the user equipment, where the service information includes priority information of the user equipment and/or quality of service of a service currently executed by the user equipment.

In a sixth possible implementation form according to the fifth possible implementation form of the first aspect, after the determining service information of the user equipment, further including:

notifying the service information to the target base station for the handover and the neighbouring base station, so that after obtaining the designated channel resource notified by the source base station, the target base station for the handover and the neighbouring base station make the reservation determination according to the designated channel resource and the service information.

In a seventh possible implementation form according to the first aspect, the first possible implementation form of the first aspect, the second possible implementation form of the first aspect, the third possible implementation form of the first aspect, the fourth possible implementation form of the first aspect, the fifth possible implementation form of the first aspect, and the sixth possible implementation form of the first aspect, the result of the reservation determination includes indication information of agreeing to reserve or indication information of refusing to reserve or indication of refusing to reserve and a reason for the refusing.

In a second aspect, the present invention provides a device for handover of a mobile terminal between base stations, including:

an obtaining unit, configured to obtain, by a source base station, a designated channel resource, where the designated channel resource is a channel resource used by the source base station to send a handover command to user equipment to be handed over;

a notifying unit, configured to notify, by the source base station, the designated channel resource obtained by the obtaining unit to a target base station for the handover and a neighbouring base station, so that the target base station for the handover and the neighbouring base station make reservation determination according to the designated channel resource; where the neighbouring base station is a base station being able to use the designated channel resource;

a receiving unit, configured to receive, by the source base station, results of the reservation determination sent by the target base station for the handover and the neighbouring base station;

a sending unit, configured to, when it is determined, according to the results of the reservation determination of the target base station for the handover and the neighbouring base station, that the source base station is able to use the designated channel resource to send the handover command to the user equipment to be handed over, then use the designated channel resource to send the handover command to the user equipment to be handed over.

In a first possible implementation form of the second aspect, the obtaining unit includes:

an obtaining module, configured to obtain, by the source base station, an idle channel resource, where the idle channel resource includes an idle channel resource of the source base station and/or an idle channel resource of the target base station for the handover;

a selecting module, configured to select, by the source base station, the designated channel resource according to the idle channel resource.

In a second possible implementation form according to the first possible implementation form of the second aspect, the selecting module includes:

a determining sub-module, configured to determine, by the source base station, from the idle channel resource, a channel resource with a maximum signal-to-interference-plus-noise ratio to be the designated channel resource;

and/or, determine, by the source base station, from the idle channel resource, a channel resource which relates to a minimum number of a co-frequency interference base station to be the designated channel resource;

and/or, determine, by the source base station, from the idle channel resource, a channel resource with minimum co-frequency interference to be the designated channel resource.

In a third possible implementation form, the notifying unit includes:

a sending module, configured to carry an identification of the designated channel resource in a handover request to send to the target base station;

the sending module is further configured to carry an identification of the designated channel resource in an indication signaling to send to the neighbouring base station.

In a fourth possible implementation form, further include:

a determining unit, configured to, after the notifying unit notifies the designated channel resource to the target base station for the handover and the neighbouring base station, if the result of the reservation determination sent by the target base station for the handover is not received within a designated time, then determine that the target base station for the handover agrees to reserve the designated channel resource for the user equipment;

the determining unit is further configured to, after the notifying unit notifies the designated channel resource to the target base station of the handover and the neighbouring base station, if the result of the reservation determination sent by the neighbouring base station is not received within the designated time, then determine that the neighbouring base station agrees to reserve the designated channel resource for the user equipment.

In a fifth possible implementation form according to the second aspect, the first possible implementation form of the second aspect, the second possible implementation form of the second aspect, the third possible implementation form of the second aspect, and the fourth possible implementation form of the second aspect, the determining unit is further configured to determine, before the notifying unit notifies the designated channel resource to the target base station for the handover and the neighbouring base station, service information of the user equipment, where the service information includes priority information of the user equipment and/or quality of service of a service currently executed by the user equipment.

In a sixth possible implementation form according to the fifth possible implementation form of the second aspect, the notifying unit is further configured to notify, after the determining unit determines the service information of the user equipment, the service information to the target base station for the handover and the neighbouring base station, so that the target base station for the handover and the neighbouring base station make the reservation determination according to the designated channel resource and the service information after obtaining the designated channel resource notified by the source base station.

In a seventh possible implementation form according to the second aspect, the first possible implementation form of the second aspect, the second possible implementation form of the second aspect, the third possible implementation form of the second aspect, the fourth possible implementation form of the second aspect, the fifth possible implementation form of the second aspect, and the sixth possible implementation form of the second aspect, the result of the reservation determination includes indication information of agreeing to reserve or indication information of refusing to reserve or indication of refusing to reserve and a reason for the refusing.

In the method and the device for handover of a mobile terminal between base stations according to the embodiments of the present invention, a source base station obtains a designated channel resource, and, by negotiating with a target base station and a neighbouring base station, determines to send a handover command to user equipment. In the prior art, in order to ensure transmission of the handover command from the source base station, a service of user equipment which is currently served by the neighbouring base station or the target base station using the channel resources may be interrupted. Technical solutions according to the embodiments of the present invention can realize handover of user equipment between base stations in a condition of ensuring business services of the neighbouring base station and the target base station are not interrupted.

BRIEF DESCRIPTION OF DRAWINGS

In order to describe technical solutions in embodiments of the present invention or in the prior art more clearly, the following briefly introduces accompanying drawings needed for describing the embodiments or the prior art. Apparently, the accompanying drawings in the following description illustrate merely some embodiments of the present invention, and persons of ordinary skill in the art may still derive other drawings from these accompanying drawings without creative efforts.

DESCRIPTION OF EMBODIMENTS

Technical solutions in embodiments of the present invention are hereinafter described in detail with reference to accompanying drawings in the embodiments of the present invention. It is evident that the embodiments are only some exemplary embodiments of the present invention rather than all embodiments of the present invention. Other embodiments that those skilled in the art obtain based on the embodiments of the present invention without creative efforts also fall within the protection scope of the present invention.

Figure 1:
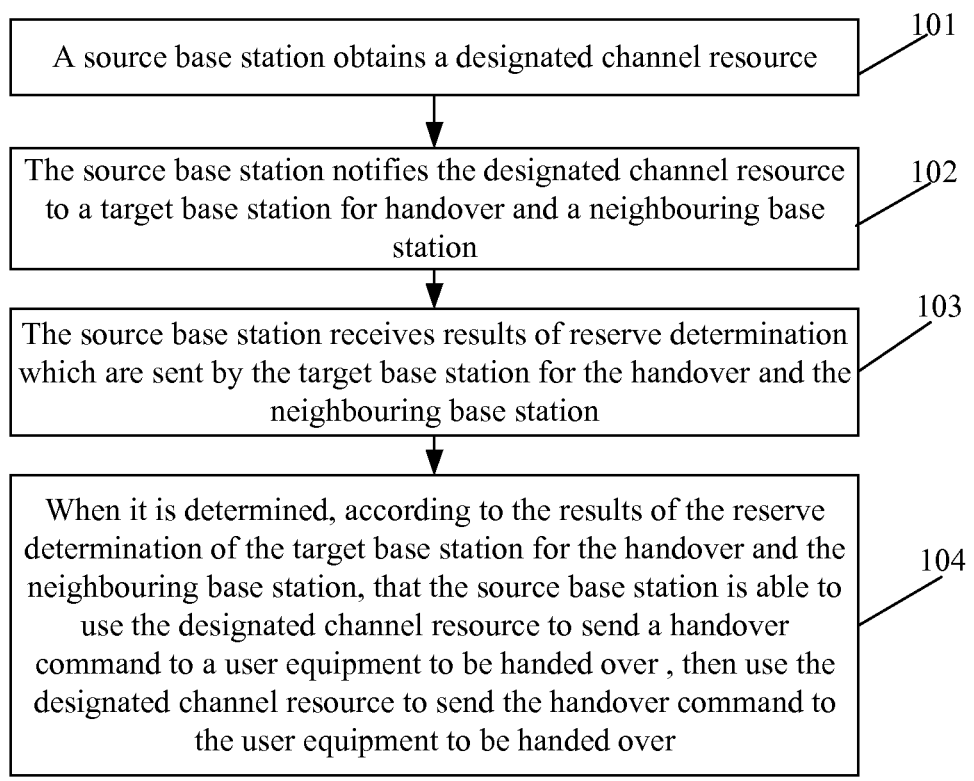
FIG. 1 is a flowchart of a method for handover of a mobile terminal between base stations according to an embodiment of the present invention.

An embodiment of the present invention provides a method for handover of a mobile terminal between base stations, as shown in FIG. 1, the method includes:

101, a source base station obtains a designated channel resource.

The designated channel resource is a channel resource used by the source base station to send a handover command to user equipment to be handed over.

Optionally, the obtaining, by a source base station, a designated channel resource, specifically includes:

First step, the source base station obtains an idle channel resource, and the idle channel resource includes an idle channel resource of the source base station and/or an idle channel resource of a target base station for handover.

Second step, the source base station selects the designated channel resource according to the idle channel resource.

Optionally, there are three methods to select the designated channel resource according to the idle channel resource:

First method: the source base station determines, from the idle channel resource, a channel resource with a maximum signal-to-interference-plus-noise ratio to be the designated channel resource.

And/or,

The second method: the source base station determines, from the idle channel resource, a channel resource which relates to a minimum number of a co-frequency interference base station to be the designated channel resource.

And/or,

The third method: the source base station determines, from the idle channel resource, a channel resource with minimum co-frequency interference to be the designated channel resource.

Where, a numerator of the signal-to-interference-plus-noise ratio is power of a signal, a denominator is a sum of interference and noise. Relating to a minimum number of a co-frequency interference base station, means that the channel resource is used by a minimum number of the neighbouring base station. The channel resource with minimum co-frequency interference means that a strength of the co-frequency interference that the channel resource is subject to is minimum Optionally, according to practical situations, any one or ones of the aforementioned methods can be selected to designate a channel resource. For example, there are three idle channel resources which are numbered 1, 2 and 3. Where, 1 is subject to strong interference from two base stations; 2 is subject to strong interference from one base station; 3 is subject to week interference from two base stations, and the sum of the strength of two week interferences to 3 is smaller than the strength of the strong interference to 2. In this situation, we can choose 2. Although the strength of the interference that it is subject to is not the smallest, but it can reduce the number of the base station that we need to negotiate with by one.

Besides, it should be noted that, in the aforementioned specific example, the channel resource number 2 relates to the minimum number of the co-frequency interference base station, and the strength of the co-frequency interference that number 3 is subject to is minimum.

102, the source base station notifies the designated channel resource to a target base station for handover and a neighbouring base station, so that the target base station for the handover and the neighbouring base station make reservation determination according to the designated channel resource; where the neighbouring base station is a base station being able to use the designated channel resource.

Optionally, the source base station may notify the designated channel resource to the target base station for the handover and the neighbouring base station by following manners.

The source base station carries an identification the designated channel resource in a handover request to send to the designated channel resource.

The source base station carries an identification the designated channel resource in an indication signaling to send to the neighbouring base station.

Where, the handover request or the indication signaling is respectively used to request the channel resource from the target base station or the neighbouring base station.

It should be noted that, the handover request at least includes a mobile parameter of the user equipment, and may include any other information according to practical situations. The indication signaling includes information such as a load information indication, a resource status request, a radio resource status information check, etc. The channel resource may be carried in any type or types of information of the load information indication, the resource status request, the radio resource status information check.

Optionally, before executing this step, the source base station may further determine service information of the user equipment. Where, the service information includes priority information of the user equipment and/or quality of service of a service currently executed by the user equipment.

The service information is notified to the target base station for the hand over and the neighbouring base station, the implementing manner of which is the same as that of notifying, by the source base station, the designated channel resource to the target base station for the handover and the neighbouring base station. The details will not be repeatedly described herein.

103, the source base station receives results of the reservation determination which are sent by the target base station for the handover and the neighbouring base station.

Where, a result of reservation determination includes indication information of agreeing to reserve or indication information of refusing to reserve or indication of refusing to reserve and a reason for the refusing.

Optionally, after the source base station notifies the designated channel resource to the target base station for the hand over and the neighbouring base station, if the result of the reservation determination sent by the target base station for the handover is not received within a designated time, then it is determined that the target base station for the handover agrees to reserve the designated channel resource for the user equipment; if the result of the reservation determination sent by the neighbouring base station is not received within the designated time, then it is determined that the neighbouring base station agrees to reserve the designated channel resource for the user equipment.

It should be noted that, when not agreeing to reserve the designated channel resource for the user equipment, the target base station for the handover and the neighbouring base station need to return the indication of refusing to reserve and the reason for the refusing, back to the source base station. Where, the reason for the refusing includes information such as needing to reserve the resource for transmission of a high priority service such as a system message, needing to reserve the resource for transmission of a handover command (carrying relevant information of a mobile terminal that is intended to be handed over, such as a user priority), needing to reserve the resource for transmission of common data, etc. Here, the reasons for the refusing are just for illustration; according to practical situations, any other reasons for refusing may be included, which is not limited in the embodiment of the present invention.

104, when it is determined, according to the results of the reservation determination of the target base station for the handover and the neighbouring base station, that the source base station is able to use the designated channel resource to send a handover command to user equipment to be handed over, then use the designated channel resource to send the handover command to the user equipment to be handed over.

According to the method for handover of a mobile terminal between base stations according to the embodiment of the present invention, a source base station obtains a designated channel resource, and, by negotiating with a target base station and a neighbouring base station, determines to send a handover command to user equipment. In the prior art, in order to ensure transmission of the handover command from the source base station, a service of user equipment which is currently served by the neighbouring base station or the target base station using the channel resource would be interrupted. The technical solution according to the embodiment of the present invention can realize handover of user equipment between base stations in a condition of ensuring that business services of the neighbouring base station and the target base station are not interrupted.

Figure 2:
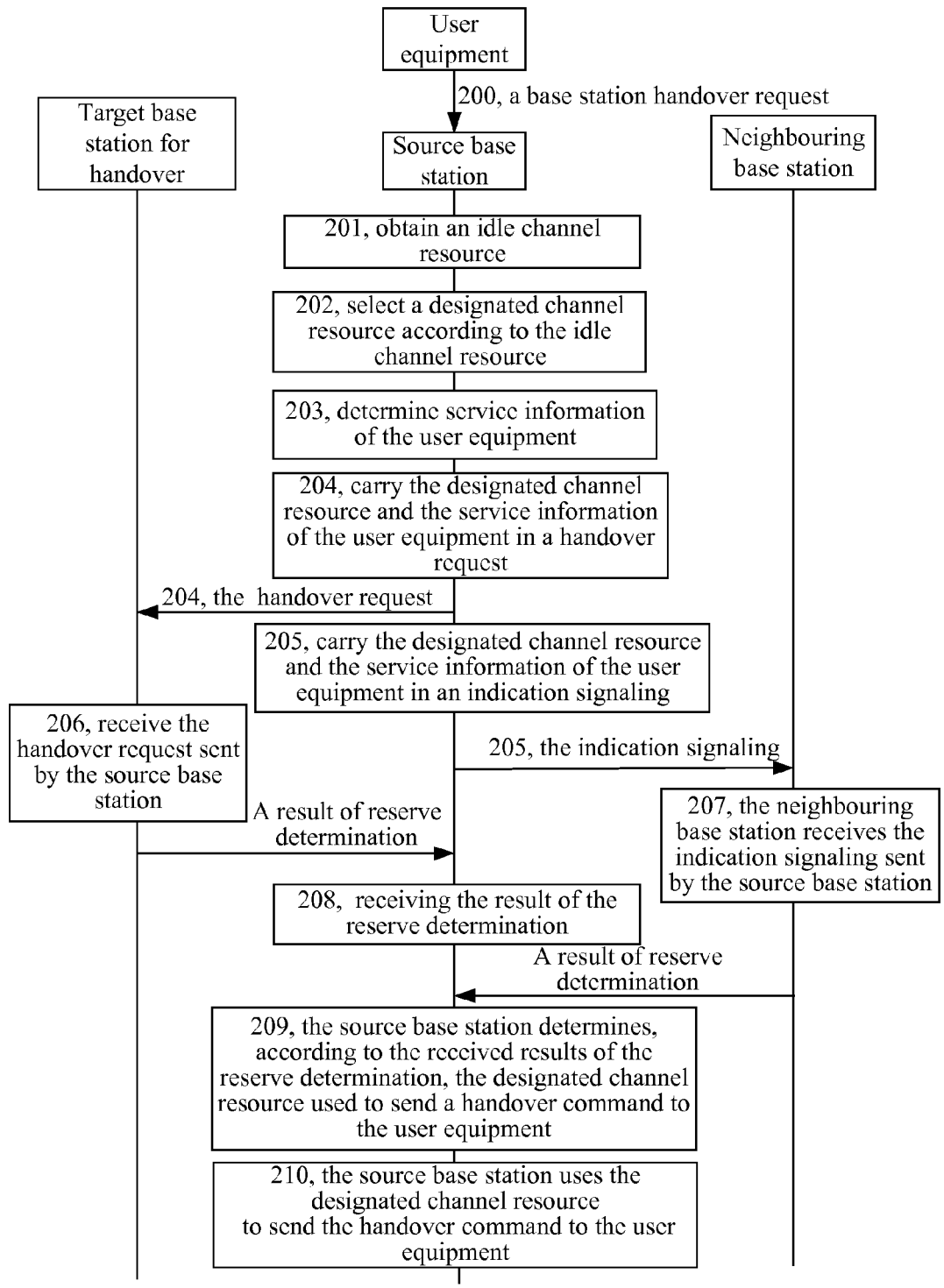
FIG. 2 is a flowchart of a method for handover of a mobile terminal between base stations according to another embodiment of the present invention.

Another embodiment of the present invention provides a method for handover of a mobile terminal between base stations, as shown in FIG. 2, the method includes:

200, a source base station receives a base station handover request sent by user equipment.

It should be noted that, when the user equipment crosses a boundary of one cell and gets to another cell, it needs to be handed over from the source base station of a region where the mobile terminal currently locates to a target base station for handover of a target region so as to keep communications from being interrupted, and thereby needs to send the base station handover request to the source base station.

Optionally, the user equipment may report to the source base station a mobile parameter of itself, and the source base station determines whether the user equipment needs to perform base station handover or not.

201, the source base station obtains an idle channel resource.

Where, relevant description of the idle channel resource is the same as relevant content in step 101 of the aforementioned embodiment 1, the details are not repeatedly described herein again.

Optionally, the obtaining of the idle channel resource in this step may also be executed by the user equipment, the user equipment obtains idle channel resources of the source base station and the target base station for the handover by detecting or perceiving.

202, the source base station selects a designated channel resource according to the idle channel resource.

It should be noted that, this step corresponds to relevant content in step 101 of the previous embodiment, relevant descriptions of them are the same and will not be described herein again.

203, the source base station determines service information of the user equipment.

Where, the service information includes: priority information of the user equipment and/or quality of service of a service currently executed by the user equipment.

204, the source base station carries the designated channel resource and the service information of the user equipment in a handover request and sends to a target base station for handover.

205, the source base station carries the designated channel resource and the service information of the user equipment in an indication signaling and sends to a neighbouring base station.

It should be noted that, steps 203 to 205 correspond to relevant content of step 102 in the previous embodiment, relevant descriptions are the same and will not be described herein again.

Optionally, the embodiment of the present invention does not limit the executing sequence of the aforementioned steps 202, 203, i.e., may also be executed in a order of step 203, step 202. Similarly, the executing sequence of the aforementioned steps 204, 205 is not limited.

Step 203 may not be executed in the embodiment of the present invention, correspondingly, in step 204 and step 205, the service information of the user equipment will not be carried any more. The embodiment of the present invention takes executing step 203 as an example.

206, the target base station for the handover receives the handover request sent by the source base station.

After receiving the handover request sent by the source base station, the target base station for the handover further executes specific steps as follows:

First step: the target base station for the handover obtains the designated channel resource in the handover request.

Second step: the target base station for the handover makes reservation determination according to the designated channel resource.

Where, making reservation determination refers to determining whether to reserve the obtained designated channel resource for the user equipment or not.

When making the reservation determination, where the reservation determination is that the target base station for the handover compares information in the received handover request with a usage situation of local channel resources and thereby determines that the designated channel resource can be reserved for the user equipment, the target base station for the handover may send the source base station indication information of agreeing to reserve as a result of the reservation determination.

When the target base station for the handover makes the reservation determination and determines that the designated channel resource cannot be reserved for the user equipment, indication information of refusing to reserve and a reason for the refusing should be sent to the source base station.

There are three following cases according to the reason for the refusing:

First case: when the reason for the refusing is "needing to reserve the resource for performing transmission of a high priority service, such as a system message", send the indication information of refusing to reserve.

Second case: when the reason for the refusing is "needing to reserve the resource for performing transmission of common data", send the indication information of agreeing to reserve.

Third case: when the reason for the refusing is "needing to reserve the resource for performing transmission of a handover command", further:

Compare the service information of the user carried in the handover request, including comparing "priority information of the user equipment, or quality of service of a service currently executed by the user equipment" with corresponding service information of user equipment for which the requested base station of the handover intends to perform a handover service, namely, comparing a value of a relevant parameter included in the service information of the user.

When the former is bigger than the latter, send the indication information of agreeing to reserve, otherwise, send the indication information of refusing to reserve and when sending the indication information of refusing to reserve, send the indication of refusing to reserve and the reason for the refusing simultaneously.

207, the neighbouring base station receives the indication signaling sent by the source base station.

It should be noted that, this step corresponds to step 206, except that the executive entity of this step is the neighbouring base station, and the operation object is the indication signaling, other relevant flows are the same as step 206, the details are not repeatedly described herein again.

208, the source base station receives results of reservation determination which are sent by the target base station for the handover and the neighbouring base station.

It should be noted that, steps 206-208 are the same as relevant descriptions in step 103 of the aforementioned embodiment, the details are not repeatedly described herein again.

209, the source base station determines, according to the received results of the reservation determination, the designated channel resource used to send a handover command to the user equipment.

It should be noted that, when the results of the reservation determination received by the source base station are all the indication information of agreeing to reserve, then execute the following step 210. Certainly, if the result of the reservation determination sent by the target base station or any one or ones of neighbouring base stations is not received by the source base station within a designated time, then consider that a base station which does not return the result of the reservation determination agrees to reserve the designated channel resource.

When the source base station receives the indication information of refusing, execute step 201 again.

210, the source base station uses the designated channel resource to send the handover command to the user equipment.

According to the method for handover of a mobile terminal between base stations of the embodiment of the present invention, a source base station obtains a designated channel resource, and, by negotiating with a target base station and a neighbouring base station, determines to send a handover command to user equipment. In the prior art, in order to ensure transmission of the handover command from the source base station, a service of user equipment which is currently served by the neighbouring base station or the target base station using the channel resources would be interrupted. The technical solution according to the embodiment of the present invention can realize handover of user equipment between base stations in a condition of ensuring that business services of the neighbouring base station and the target base station are not interrupted.

Figure 3:
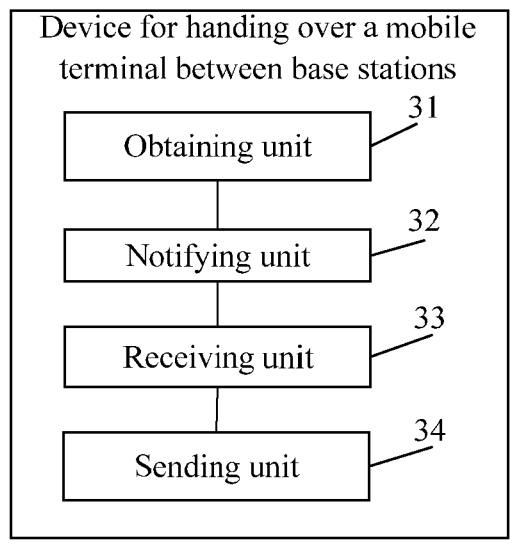
FIG. 3 is a structural block diagram of a device for handover of a mobile terminal between base stations according to another embodiment of the present invention.

Another embodiment of the present invention provides a device for handover of a mobile terminal between base stations, as shown in FIG. 3, the device includes: an obtaining unit 31, a notifying unit 32, a receiving unit 33, and a sending unit 34.

The obtaining unit 31 is configured to obtain, by a source base station, a designated channel resource, where the designated channel resource is a channel resource used by the source base station to send a handover command to user equipment to be handed over.

The notifying unit 32 is configured to notify, by the source base station, the designated channel resource obtained by the obtaining unit 31 to a target base station for handover and a neighbouring base station, so that the target base station for the handover and the neighbouring base station make reservation determination according to the designated channel resource; where the neighbouring base station is a base station being able to use the designated channel resource.

The receiving unit 33 is configured to receive, by the source base station, results of the reservation determination which are sent by the target base station for the handover and the neighbouring base station.

The sending unit 34 is configured to, when it is determined, according to the results of the reservation determination of the target base station for the handover and the neighbouring base station, that the source base station is able to use the designated channel resource to send the handover command to the user equipment to be handed over, then use the designated channel resource to send the handover command to the user equipment to be handed over.

Figure 4:
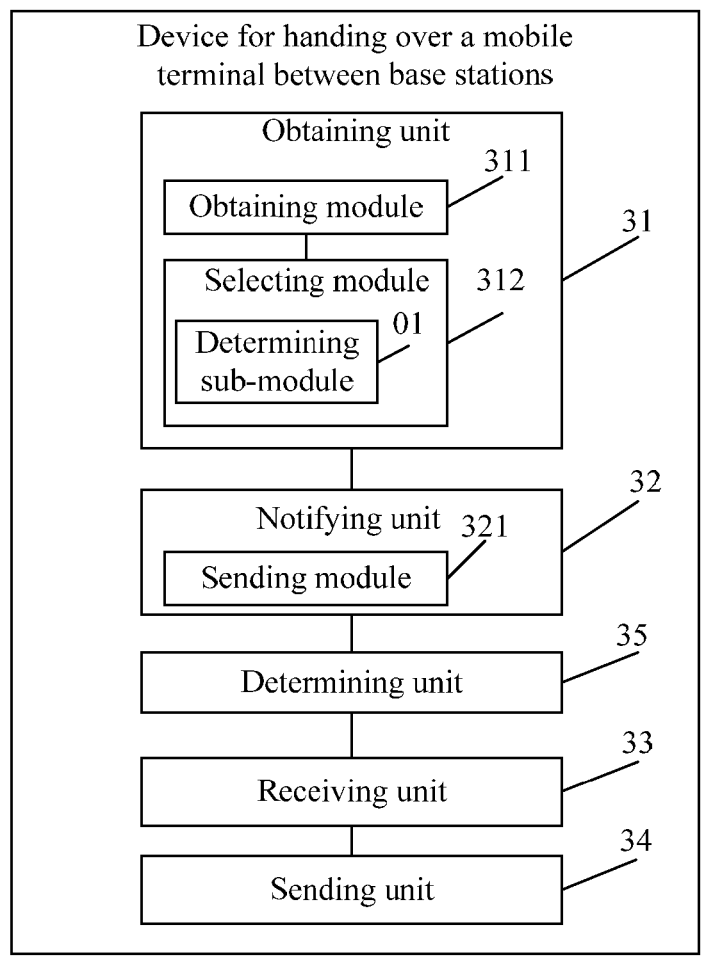
FIG. 4 is a structural block diagram of a device for handover of a mobile terminal between base stations according to another embodiment of the present invention.

Optionally, as shown in FIG. 4, the obtaining unit includes an obtaining module 311, and a selecting module 312 which includes a determining sub-module 01; the notifying unit 32 includes a sending module 321; the device further includes a determining unit 35.

The obtaining module 311 is configured to obtain, by the source base station, an idle channel resource, where the idle channel resource includes an idle channel resource of the source base station and/or an idle channel resource of the target base station for the handover.

The selecting module 312 is configured to select, by the source base station, the designated channel resource according to the idle channel resource obtained by the obtaining module 311.

The determining sub-module 01 is configured to determine, by the source base station, from the idle channel resource, a channel resource with a maximum signal-to-interference-plus-noise ratio to be the designated channel resource;

and/or, determine, by the source base station, from the idle channel resource, a channel resource which relates to a minimum number of a co-frequency interference base station to be the designated channel resource;

and/or, determine, by the source base station, from the idle channel resource, a channel resource with minimum co-frequency interference to be the designated channel resource.

The sending module 321 is configured to carry an identification of the designated channel resource in a handover request to send to the target base station;

the sending module 321 is further configured to carry an identification of the designated channel resource in an indication signaling to send to the neighbouring base station.

The determining unit 35 is configured to, after the notifying unit 32 notifies the designated channel resource to the target base station for the handover and the neighbouring base station, if the result of the reservation determination sent by the target base station for the handover is not received within a designated time, then determine that the target base station for the handover agrees to reserve the designated channel resource for the user equipment.

Optionally, the determining unit 35 is further configured to, after the notifying unit 32 notifies the designated channel resource to the target base station for the handover and the neighbouring base station, if the result of the reservation determination sent by the neighbouring base station is not received within a designated time, then determine that the neighbouring base station agrees to reserve the designated channel resource for the user equipment.

The determining unit 35 is further configured to determine, before the notifying unit 32 notifies the designated channel resource to the target base station for the handover and the neighbouring base station, service information of the user equipment, where the service information includes priority information of the user equipment and/or quality of service of a service currently executed by the user equipment.

Optionally, the notifying unit 32 is further configured to notify, after the determining unit 35 determines the service information of the user equipment, the service information to the target base station for the handover and the neighbouring base station, so that the target base station for the handover and the neighbouring base station make the reservation determination according to the designated channel resource and the service information after obtaining the designated channel resource notified by the source base station.

Optionally, the result of the reservation determination includes indication information of agreeing to reserve or indication information of refusing to reserve or indication of refusing to reserve and a reason for the refusing.

According to the device for handover of a mobile terminal between base stations of the embodiment of the present invention, a source base station obtains a designated channel resource, and, by negotiating with a target base station and a neighbouring base station, determines to send a handover command to user equipment. In the prior art, in order to ensure transmission of the handover command from the source base station, a service of user equipment which is currently served by the neighbouring base station or the target base station using the channel resources would be interrupted. The technical solution according to the embodiment of the present invention can realize handover of user equipment between base stations in a condition of ensuring that business services of the neighbouring base station and the target base station are not interrupted.

Figure 5:
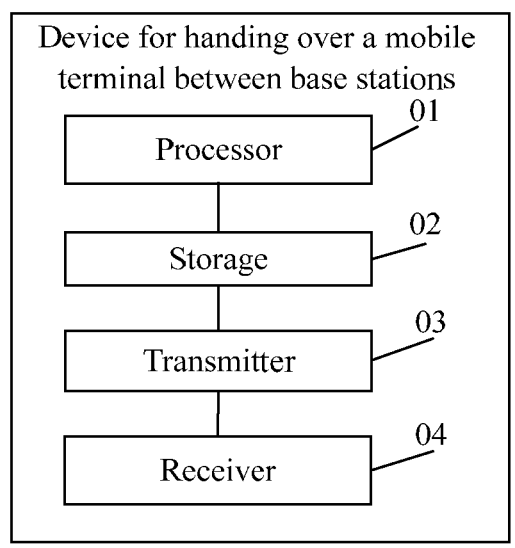
FIG. 5 is a structural block diagram of a device for handover of a mobile terminal between base stations according to another embodiment of the present invention.

Another embodiment of the present invention provides a device for handover of a mobile terminal between base stations, as shown in FIG. 5, including: a processor 01, a storage 02, a transmitter 03, and a receiver 04.

The processor 01 is configured to obtain a designated channel resource.

The storage 02 is configured to store the designated channel resource.

The transmitter 03 is configured to notify the designated channel resource to a target base station for handover and a neighbouring base station.

The receiver 04 is configured to receive results of reservation determination sent by the target base station for the handover and the neighbouring base station.

The storage 02 is further configured to store the results of the reservation determination.

The transmitter 03 is further configured to, when it is determined, according to the results of the reservation determination of the target base station for the handover and the neighbouring base station, that the source base station is able to use the designated channel resource to send a handover command to user equipment to be handed over, then use the designated channel resource to send the handover command to the user equipment to be handed over.

The storage 02 is further configured to store the handover command.

The processor 01 is further configured to obtain an idle channel resource.

The storage 02 is further configured to store the idle channel resource.

The processor 01 is further configured to select the designated channel resource according to the idle channel resource.

The processor 01 is further configured to determine, by the source base station, from the idle channel resource, a channel resource with a maximum signal-to-interference-plus-noise ratio to be the designated channel resource;

and/or, determine, by the source base station, from the idle channel resource, a channel resource which relates to a minimum number of a co-frequency interference base station to be the designated channel resource;

and/or, determine, by the source base station, from the idle channel resource, a channel resource with minimum co-frequency interference to be the designated channel resource.

The transmitter 03 is further configured to carry an identification of the designated channel resource in a handover request to send to the target base station, and carry an identification of the designated channel resource in an indication signaling to send to the neighbouring base station.

The storage 02 is further configured to store the handover request and the indication signaling.

The processor 01 is further configured to, if the result of the reservation determination sent by the target base station for the handover is not received within a designated time, then determine that the target base station for the handover agrees to reserve the designated channel resource for the user equipment; if the result of the reservation determination sent by the neighbouring base station is not received within a designated time, then determine that the neighbouring base station agrees to reserve the designated channel resource for the user equipment.

The processor 01 is further configured to determine service information of the user equipment.

The storage 02 is further configured to store the service information.

The transmitter 03 is further configured to notify the service information to the target base station for the handover and the neighbouring base station.

According to the device for handover of a mobile terminal between base stations of the embodiment of the present invention, a source base station obtains a designated channel resource, and, by negotiating with a target base station and a neighbouring base station, determines to send a handover command to user equipment. In the prior art, in order to ensure transmission of the handover command from the source base station, a service of user equipment which is currently served by the neighbouring base station or the target base station using the channel resources would be interrupted. The technical solution according to the embodiment of the present invention can realize handover of user equipment between base stations in a condition of ensuring that business services of the neighbouring base station and the target base station are not interrupted.

Through the descriptions of the foregoing implementation manners, a person skilled in the art may clearly understand that the present invention may be implemented using software plus necessary universal hardware, and certainly may be implemented using hardware. However, in most cases, the former is a preferred implementation manner. Based on such understanding, the technical solutions of the present invention essentially, or the part contributing to the prior art may be implemented in a form of a software product. The computer software product is stored in a readable storage medium, such as a floppy disk, a hard disk, or an optical disc etc of a computer, and includes several instructions to enable a computer device (which may be a personal computer, a server, a network device, etc) to execute the methods described in the embodiments of the present invention.

The foregoing descriptions are merely specific embodiments of the present invention, but are not intended to limit the protection scope of the present invention. Changes or replacements that can be easily figured out by persons skilled in the art within the technical scope disclosed in the present invention shall all fall within the protection scope of the present invention. Therefore, the protection scope of the present invention shall be subject to that of the claims.

What is claimed is:

1. A method for handover of a mobile terminal between base stations, comprising:
   obtaining, by a source base station, a designated channel resource, wherein the designated channel resource is a channel resource used by the source base station to send a handover command to user equipment to be handed over;
   notifying, by the source base station, the designated channel resource to a target base station for the handover and a neighboring base station, so that the target base station for the handover and the neighboring base station makes reservation determination according to the designated channel resource; wherein the neighboring base station is a base station being able to using the designated channel resource;
   receiving, by the source base station, results of the reservation determination which are sent by the target base station for the handover and the neighboring base station;
   when it is determined, according to the results of the reservation determination of the target base station for the handover and the neighboring base station, that the source base station is able to use the designated channel resource to send the handover command to the user equipment to be handed over, then using the designated channel resource to send the handover command to the user equipment to be handed over.

2. The method according to claim 1, wherein the obtaining, by a source base station, a designated channel resource comprises:

obtaining, by the source base station, an idle channel resource, wherein the idle channel resource comprises an idle channel resource of the source base station and/or an idle channel resource of the target base station for the handover;

selecting, by the source base station, the designated channel resource according to the idle channel resource.

3. The method according to claim 2, wherein the selecting, by the source base station, the designated channel resource according to the idle channel resource comprises at least one of:

determining, by the source base station, from the idle channel resource, a channel resource with a maximum signal-to-interference-plus-noise ratio to be the designated channel resource;

determining, by the source base station, from the idle channel resource, a channel resource which relates to a minimum number of a co-frequency interference base station to be the designated channel resource; and determining, by the source base station, from the idle channel resource, a channel resource with minimum co-frequency interference to be the designated channel resource.

4. The method according to claim 1, wherein the notifying, by the source base station, the designated channel resource to a target base station for the handover and a neighboring base station comprises:

carrying an identification of the designated channel resource in a handover request to send to the target base station; and carrying an identification of the designated channel resource in an indication signaling to send to the neighboring base station.

5. The method according to claim 1, wherein after the notifying the designated channel resource to a target base station for the handover and a neighboring base station, further comprising:

if the result of the reservation determination sent by the target base station for the handover is not received within a designated time, then determining that the target base station for the handover agrees to reserve the designated channel resource for the user equipment;

if the result of the reservation determination sent by the neighboring base station is not received within the designated time, then determining that the neighboring base station agrees to reserve the designated channel resource for the user equipment.

6. The method according to claim 1, wherein before the notifying, by the source base station, the designated channel resource to a target base station for the handover and a neighboring base station, further comprising:

determining service information of the user equipment, wherein the service information comprises priority information of the user equipment and/or quality of service of a service currently executed by the user equipment.

7. The method according to claim 6, wherein after the determining service information of the user equipment, further comprising:

notifying the service information to the target base station for the handover and the neighboring base station, so that, after obtaining the designated channel resource notified by the source base station, the target base station for the handover and the neighboring base station make the reservation determination according to the designated channel resource and the service information.

8. The method according to claim 1, wherein the result of the reservation determination comprises indication information of agreeing to reserve or indication information of refusing to reserve or indication of refusing to reserve and a reason for the refusing.

9. A device for handover of a mobile terminal between base stations, comprising:

an obtaining unit, configured to obtain, by a source base station, a designated channel resource, wherein the designated channel resource is a channel resource used by the source base station to send a handover command to user equipment to be handed over;

a notifying unit, configured to notify, by the source base station, the designated channel resource obtained by the obtaining unit to a target base station for the handover and a neighboring base station, so that the target base station for the handover and the neighboring base station make reservation determination according to the designated channel resource; wherein the neighboring base station is a base station being able to use the designated channel resource;

a receiving unit, configured to receive, by the source base station, results of the reservation determination sent by the target base station for the handover and the neighboring base station; and a sending unit, configured to, when it is determined, according to the results of the reservation determination of the target base station for the handover and the neighboring base station, that the source base station is able to use the designated channel resource to send the handover command to the user equipment to be handed over, then use the designated channel resource to send the handover command to the user equipment to be handed over.

10. The device according to claim 9, wherein the obtaining unit comprises:

an obtaining module, configured to obtain, by the source base station, an idle channel resource, wherein the idle channel resource comprises an idle channel resource of the source base station and/or an idle channel resource of the target base station for the handover; and a selecting module, configured to select, by the source base station, the designated channel resource according to the idle channel resource.

11. The device according to claim 10, wherein the selecting module comprises at least one of:

a determining sub-module, configured to determine, by the source base station, from the idle channel resource, a channel resource with a maximum signal-to-interference-plus-noise ratio to be the designated channel resource;

determine, by the source base station, from the idle channel resource, a channel resource which relates to a minimum number of a co-frequency interference base station to be the designated channel resource; and determine, by the source base station, from the idle channel resource, a channel resource with minimum co-frequency interference to be the designated channel resource.

12. The device according to claim 9, wherein the notifying unit comprises:

a sending module, configured to carry an identification of the designated channel resource in a handover request to send to the target base station;

the sending module is further configured to carry an identification of the designated channel resource in an indication signaling to send to the neighboring base station.

13. The device according to claim 9, wherein the device further comprises:

a determining unit, configured to, after the notifying unit notifies the designated channel resource to the target base station for the handover and the neighboring base station, if the result of the reservation determination sent by the target base station for the handover is not received within a designated time, then determine that the target base station for the handover agrees to reserve the designated channel resource for the user equipment;

the determining unit is further configured to, after the notifying unit notifies the designated channel resource to the target base station for the handover and the neighboring base station, if the result of the reservation determination sent by the neighboring base station is not received within the designated time, then determine that the neighboring base station agrees to reserve the designated channel resource for the user equipment.

14. The device according to claim 9, wherein the determining unit is further configured to determine, before the notifying unit notifies the designated channel resource to the target base station for the handover and the neighboring base station, service information of the user equipment, wherein the service information comprises priority information of the user equipment and/or quality of service of a service currently executed by the user equipment.

15. The device according to claim 14, wherein the notifying unit is further configured to notify, after the determining unit determines the service information of the user equipment, the service information to the target base station for the handover and the neighboring base station, so that after obtaining the designated channel resource notified by the source base station, the target base station for the handover and the neighboring base station make the reservation determination according to the designated channel resource and the service information.

16. The device according to claim 9, wherein the result of the reservation determination comprises indication information of agreeing to reserve or indication information of refusing to reserve or indication of refusing to reserve and a reason for the refusing.

* * * * *

UNITED STATES PATENT AND TRADEMARK OFFICE
CERTIFICATE OF CORRECTION

PATENT NO. : 9,622,122 B2  
APPLICATION NO. : 14/719998  
DATED : April 11, 2017  
INVENTOR(S) : Zeng et al.

Page 1 of 1

It is certified that error appears in the above-identified patent and that said Letters Patent is hereby corrected as shown below:

On the Title Page

Left column, item (73), replace "HUAHEI" with --HUAWEI--.

Signed and Sealed this
Tenth Day of July, 2018

Andrei Iancu
*Director of the United States Patent and Trademark Office*